May 16, 1950     F. E. HENDRICKSON     2,508,065
BUFFING WHEEL
Filed April 30, 1947
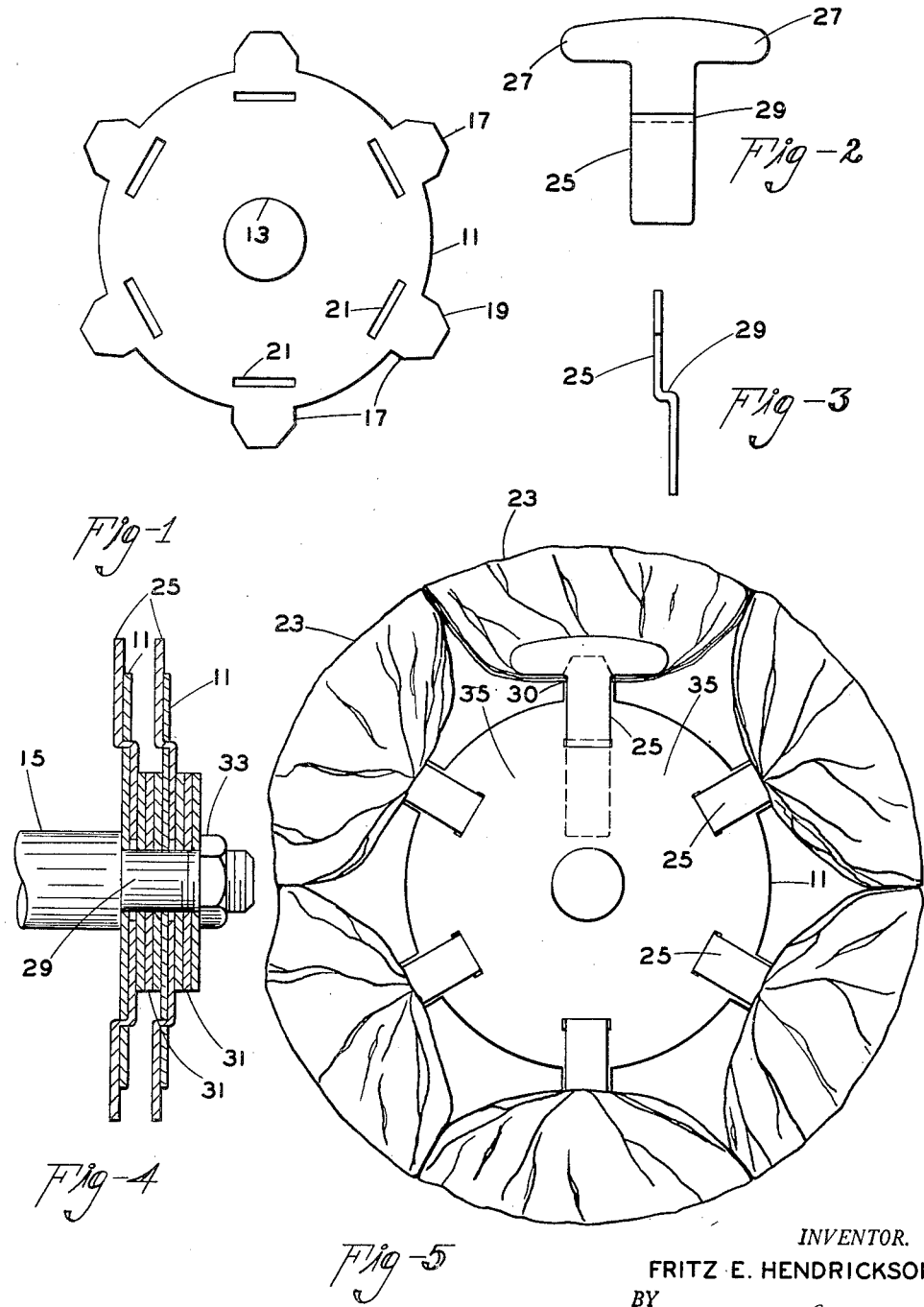
INVENTOR.
FRITZ E. HENDRICKSON
BY
*H. M. Bieber*
ATT'Y.

Patented May 16, 1950

2,508,065

UNITED STATES PATENT OFFICE 2,508,065

BUFFING WHEEL

Fritz E. Hendrickson, South Elgin, Ill., assignor of fifty per cent to Murray Ireland, Elgin, Ill.

Application April 30, 1947, Serial No. 745,070

5 Claims. (Cl. 51—193)

My invention relates to buffing wheels.

One of the objects of my invention is to provide a novel form of assembly of buffing wheels.

Another object of my invention is to provide a simple means of holding the flexible sections of a composite buffing wheel on a support.

Another object of my invention is to provide a novel form for supporting the flexible sections on a solid disc so as to permit of obtaining thorough ventilation thereof.

Other objects of my invention will either be apparent from a description of one form of device embodying my invention or will be set forth in the course of such description and particularly in the appended claims.

In the drawings,

Figure 1 is a view in front elevation of a central supporting disc,

Fig. 2 is a view in front elevation of a holding member,

Fig. 3 is a view in side elevation of the part shown in Fig. 2,

Fig. 4 is a view in vertical longitudinal section of assembled parts embodying my invention, and, Fig. 5 is a view in side elevation of a set of sections assembled on the disc of Fig. 1.

Referring first of all to Fig. 1, I have there shown a single, preferably metallic, disc 11 which may be made, if metallic, of sheet metal, preferably sheet steel, having a thickness of, say, about 1/16". Disc 11 is provided with a central aperture 13 therein, the diameter of this aperture being such as will enable it to be mounted on a driving shaft 15 (Fig. 4).

Disc 11 is provided with a plurality of projections 17 evenly spaced around the periphery of the disc. The projections 17 may have angularly extending outer corners 19 or, while not shown, they may have substantially semi-circular outer end portions. I provide each disc 11 with a plurality of apertures 21 therein, each aperture being alined peripherally of the disc 11 with a projection 17. Each aperture 21 is of substantially rectangular shape and has its longest dimension extending trans-radial of the disc 11 within a short distance of the outer periphery thereof. Specifically, each of the elongated apertures 21 lies perpendicular to the radius that passes through its center. I provide holding means for supporting a plurality of flexible plies 23, this supporting means comprising a member 25 of substantially T-shape. The outer end portion of each of the widened outer end portions of the supporting members 25 is provided with rounded ends 27 for a reason which will hereinafter appear. The main stem portion of each member 25 is provided with an offset portion 29 which is adapted to fit into one of the openings 21 in disc 11.

I have shown the disc 11 provided with six peripherally spaced projections 17 and with six openings 21 therethrough. Six flexible buffer sections 23 are adapted to be supported on disc 11, each section 23 comprising from four to eight or ten plies of the usual cotton cloth, each ply being of either circular or of slightly oval shape and having a substantially central opening therethrough. In assembling the sections 23 on disc 11, it is only necessary to push the main stem of supporting member 25 through the central aperture 30 in the assembled plies 23 after folding them once on a diameter, after which the supports 25 are assembled on disc 11 substantially as shown in Fig. 4 of the drawings, the projections 17 extending into the central aperture in the flexible sections. The outer end portions have rounded ends 27 to cooperate with and fit closely into the sections when they are subject to centrifugal force when running at operative speed.

The motor driven shaft 15 is provided with a reduced end portion 29 and a disc 11, together with the six sets of sections, is then mounted on the inner end of the reduced end portion 29. I then place a plurality of relatively thin washers 31 of a diameter to overlap the inner ends of members 25 adjacent to the outer surface of the supports 25. I then place a second disc 11, together with the supports 25 and the sections 23 mounted thereon adjacent to the outer surface of the outer washer 31. I then place at least one, and preferably several, additional washers 31 against the outer surface of the supports 25 and then hold them in proper tightly assembled positions as by a nut 33 on the screw-threaded outer end of the reduced end portion 29.

I have found that the tendency of the flexible sections 23, when the shaft 15 is run at operative speed, will be to have the outer end portions of each of the sections 23 distribute themselves in substantially zigzag shape peripherally of the buffing wheel.

I wish to here point out that it is easily possible to obtain lateral spaces between the inside portions of two adjacent sections 23 substantially as shown in Fig. 5 of the drawings by selection of the number of spacing discs 31.

While I have shown and described a buffing wheel comprising six sections 23 I do not, of course, desire to be limited thereto and in case I mount eight sections around the periphery of a disc 11 of larger diameter, this disc being provided with eight projections 17 and with eight openings 21, the result will be that the air inlet space, designated by numeral 35 in Fig. 5 of the drawings, may be somewhat reduced but a space will still be provided for permitting air to enter latterally of an assembled buffing wheel.

While I may use a small number of spacing discs 31 in the assembled buffing wheel, I may also use a larger number of such spacing discs, the number being such as to prevent tight or close engagement between the side portions of the adjacent sections 23 whereby I provide air outlet openings laterally between adjacent sections 23. These outlets for air exist in addition to the outlets for air in the body of each section provided by the plies extending in zigzag shape under the influence of centrifugal force when the wheel is running at operative speed.

The device embodying my invention thus provides a relatively very simple means which may be used over and over again to support the sections of a composite buffing wheel, the construction being such as to permit of obtaining any desired degree of ventilation between adjacent sections.

I claim as my invention:

1. In a composite buffing wheel, the combination with a single central disc having a plurality of uniformly peripherally spaced apertures therein and a plurality of centrally-apertured flexible buffing elements diametrally folded upon themselves once and held in crowded peripherally-adjacent positions outside the periphery of said disc, of means for holding said buffing elements on said disc comprising a plurality of members of substantially T-shape having an offset in the main stem portion adapted to fit into said apertures, said offset extending substantially perpendicular to the plane of the cross-arm of the T whereby in extending transverse the plane of the disc it supports the cross-arm of the T substantially parallel to the disc.

2. In a composite buffing wheel, the combination with a single central disc having a plurality of uniformly peripherally spaced openings therein and a plurality of centrally-apertured flexible buffing elements diametrally folded upon themselves once and held in crowded peripherally-adjacent positions outside the periphery of said disc, of means for holding said buffing elements on said disc comprising a plurality of members of substantially T-shape having an offset intermediate the ends of the main stem portion and fitting into said openings, each said offset extending through one of said openings of the disc, whereby the two ends of the stem of the T lie on opposite sides of the disc, the stem extending radial of the disc with the cross of the T at outer end for supporting one of said buffing elements.

3. In a composite buffing wheel, the combination comprising a single central disc having a plurality of peripherally spaced apertures therein and a corresponding plurality of peripherally spaced projections on its periphery radially aligned with said openings, a plurality of centrally-apertured flexible buffing elements diametrally folded upon themselves once and held in crowded peripherally-adjacent positions outside the periphery of said disc, and means for holding said buffing elements on said disc comprising a plurality of members each of substantially T-shape having an offset in the main stem portion of the T adapted to fit into said openings for supporting said members on said disc with said stems lying radial of the disc with the crosses of the T outermost for supporting said buffing elements, the main stem of said members of T-shape and said projections being adapted to fit into said central apertures of said buffing elements.

4. In a composite buffing wheel, the combination with a plurality of flexible buffer sections, of means for supporting them in a circular arrangement comprising a single central disc having a plurality of circumferentially spaced holes therethrough near its periphery, and a plurality of T-shaped hooks, each having the two ends of its shank offset from each other and parallel, the offset of said shank extending through one of said holes in an axial direction with said two ends of said shank lying radial against opposite faces thereof, the cross-arm of said T being at the outer end of said shank and engaging a buffer section.

5. A hub assembly for supporting a plurality of buffer sections in circumferentially spaced arrangement comprising in combination, a one-piece disc having a plurality of circumferentially spaced holes extending therethrough in an axial direction, and a plurality of T-shaped hooks each having the two ends of its shank parallel to each other and offset from each other in a direction substantially perpendicular to the cross arm of the T, and adapted to extend through one of said holes with the offset in the hole, the two ends of the shank lying radial against opposite faces of the disc and the cross arm at the outer end for engaging and supporting a buffer section.

FRITZ E. HENDRICKSON.

REFERENCES CITED

The following references are of record in the file of this patent:

UNITED STATES PATENTS

| Number | Name | Date |
|---|---|---|
| 2,280,399 | Garling | Apr. 21, 1942 |